Oct. 16, 1962   J. B. DICKSON   3,059,104
SHOCK CUSHIONED VEHICLE INDICATOR LAMPS
Filed March 13, 1961   3 Sheets-Sheet 1

INVENTORS
John B. Dickson
BY Blum, Moscovitz,
Friedman & Blum
ATTORNEYS

Oct. 16, 1962 J. B. DICKSON 3,059,104
SHOCK CUSHIONED VEHICLE INDICATOR LAMPS
Filed March 13, 1961 3 Sheets-Sheet 2
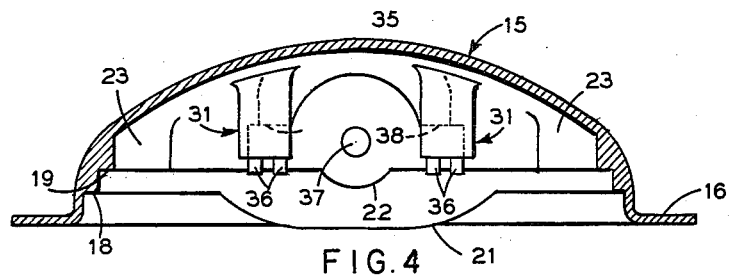
FIG. 4
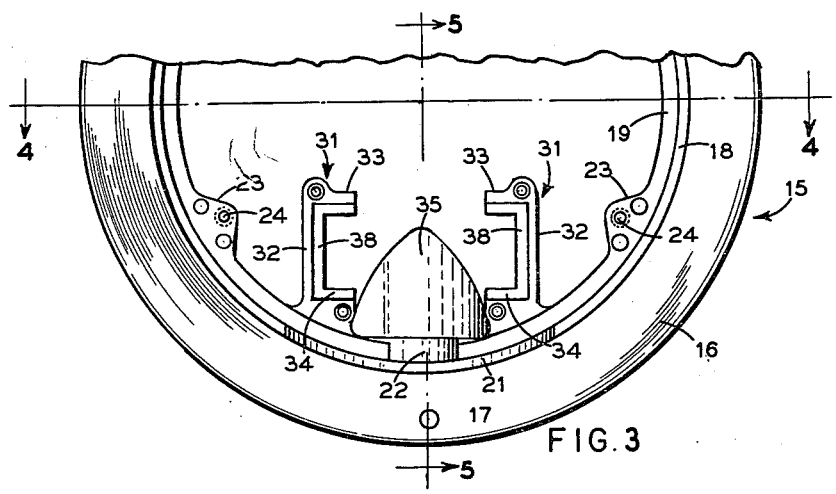
FIG. 3
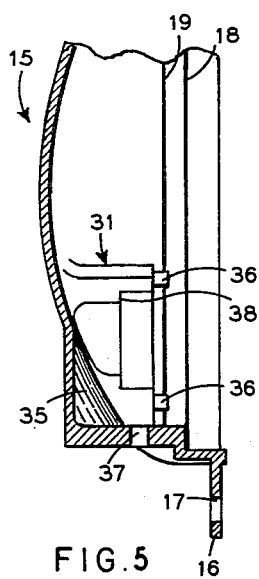
FIG. 5
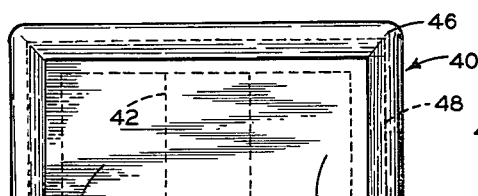
FIG. 6
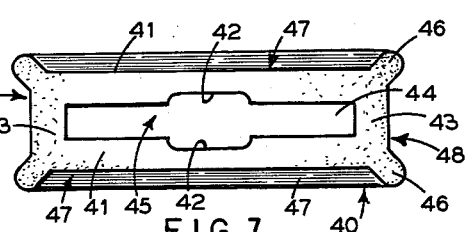
FIG. 7
FIG. 8
INVENTORS
John B. Dickson
BY Blum, Moscovitz,
Friedman & Blum
ATTORNEYS Oct. 16, 1962   J. B. DICKSON   3,059,104
SHOCK CUSHIONED VEHICLE INDICATOR LAMPS
Filed March 13, 1961   3 Sheets-Sheet 3

*INVENTORS*
John B. Dickson
BY *Blum, Moscovitz,*
*Friedman & Blum*
ATTORNEYS

United States Patent Office 3,059,104
Patented Oct. 16, 1962

3,059,104
SHOCK CUSHIONED VEHICLE
INDICATOR LAMPS
John B. Dickson, Kew Gardens, N.Y., assignor to Signal-Stat Corporation, Brooklyn, N.Y., a corporation of New York
Filed Mar. 13, 1961, Ser. No. 95,427
11 Claims. (Cl. 240—8.3)

This invention relates to lamps for commercial automotive vehicles, such as buses, trucks, and the like, and more particularly to novel combination stop, turn signal, and tail lamps having improved means for preventing breakage of the filaments of lamp bulbs and prolonging the life of such bulbs.

Automotive vehicles, and particularly commercial automotive vehicles, are subjected to recurrent road shocks in travelling over highways. These road shocks, transmitted through the chassis and frame of the vehicle, affect the relatively fragile filaments of incandescent lamp bulbs in the various marker, signalling, and driving lamps of the vehicles. Consequently, such bulbs frequently break, or become inoperative due to broken filaments, as a result of the transmitted road shocks. This requires frequent replacement of the lamp bulbs, which is somewhat difficult for the driver of the vehicle to perform en route. More importantly, the driver is frequently unaware that the lamps on the vehicle have become inoperative, as this opportunity for observing the condition of the lamps occurs only when the vehicle is stopped, as at a rest area or during a change of drivers.

With the foregoing in mind, the present invention is directed to providing novel combination stop, turn signal, and tail lamps having novel shock isolating means preventing transmission of road shocks from the vehicle to the lamp bulb, or to the lamp bulb and its socket, so that the lamp bulb is effectively isolated from transmission of road shocks thereto. Thereby, the life of the lamp bulb is greatly prolonged as compared to the normal life of the lamp bulb under similar operating conditions.

More particularly, the shock isolating mounting for the lamp socket comprises a soft rubber receptacle arranged to receive a wing or wings on the lamp socket and to be mounted in a fixed part of the lamp housing. This soft rubber receptacle, or actually a pair of the latter as actually used in practice, absorb shocks from the motor vehicle as transmitted to the lamp housing and isolate the lamp socket and the bulb therein from such shocks. Technically speaking, the shock isolating lamp socket mounting of the present invention acts in compression to perform its shock isolating or insulating function.

For an understanding of the principles of the invention, reference is made to the following description of typical embodiments thereof as illustrated in the accompanying drawing. In the drawing:

FIG. 3 is a partial front elevational view of the lamp housing with the components mounted therein being removed;

FIGS. 4 and 5 are sectional views taken on the correspondingly numbered lines of FIG. 3;

FIG. 6 is a plan view of a shock isolating member embodying the invention;

FIG. 7 is a front elevational view of the shock isolating member;

FIG. 8 is an end elevational view of the shock isolating member;

Figure 1:
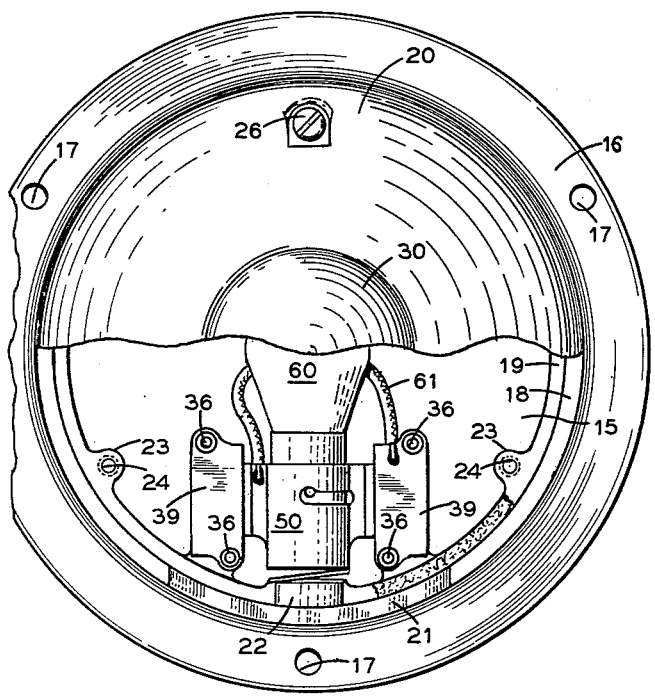
FIG. 1 is a front elevational view, with the lens partly broken away, of one form of combination lamp embodying the invention.
Figure 2:
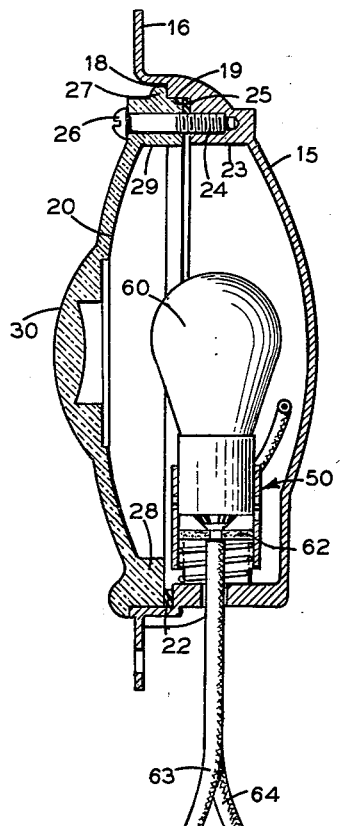
FIG. 2 is a vertical sectional view through the lamp shown in FIG. 1.
Figure 9:
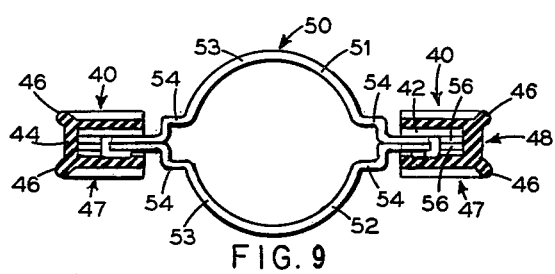
FIG. 9 is a sectional view of the lamp bulb socket as assembled with a pair of shock isolating or mounting means.
Figure 10:
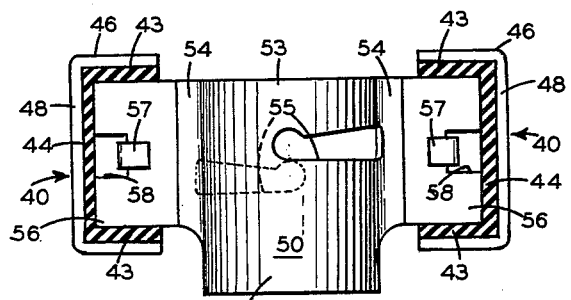
FIG. 10 is a sectional view of the socket taken at right angles to that of FIG. 9.

Referring first to FIGS. 1 through 10 of the drawing, the lamp illustrated therein is arranged to be flush mounted and is intended for use as a stop, turn signal, or tail lamp for a commercial vehicle. The lamp includes a generally cylindrical cup-shaped housing 15 having a radially extending peripheral mounting flange 16 formed with apertures 17 for flush mounting of the lamp with the housing extending through a circular recess in the mounting surface. Inwardly of flange 16, the interior surface of housing 15 is formed with stepped seating surfaces 18 and 19 which extend peripherally therearound. These stepped seating surfaces are arranged to cooperate with mating seating surfaces on a lens 20. Adjacent the lower edge of the housing, these seating surfaces are curved arcuately outwardly at 21 and 22, as best seen in FIG. 4, to accommodate the lamp bulb socket. At plural locations, preferably three in number, the seating surface 19 is extended radially inwardly as at ears 23, and formed with threaded apertures 24 to receive screws 26 securing lens 20 to housing 15 in compressive relation with a sealing gasket 25 on seating surface 19.

Lens 20 is generally outwardly convex and includes a shoulder 27 seating against surface 18 and a rib 28 seating against gasket 25. The inner surface of lens 20 is also formed with three enlargements 29 apertured to receive the screws 26 engageable into the threaded apertures 24 to secure the lens in position. Preferably, lens 20 is formed with a bull's-eye 30 which may be clear, and the portions of the surface surrounding bull's-eye 30 may be formed with circular ribs (not shown) to enhance the refractive properties of the lens. A reinforcement is formed upon the outer surface of lens at this point having an arcuate recess to conform to the portion 22 of the ledge 19.

Referring more particularly to FIGS. 3, 4 and 5, integral lamp socket supporting formations project inwardly from the inner surface of base or housing 15 adjacent seat 19 and adjacent the lower end of the housing. There are a pair of these formations, indicated at 31, 31, which are substantially U-shaped in plan, with each including a base 32 and legs 33 and 34, the legs 33, 34 extending substantially perpendicular to the base 32, and each base 32 extending substantially parallel to a vertical diameter of the housing 15. A pair of hollow pins 36 extend from the outer surface of each formation 31. Between the formations 31, the housing 15 is arcuately recessed, as indicated at 35, and an aperture 37 is formed coaxial with this recess and extends outwardly through the rim of the housing. The inner surface of each base 32 and leg 33 or 34 is relatively deeply recessed to form a seating surface 38 extending around the inside of each formation 31. The shock isolating mountings generally indicated at 40, engage seating surface 38, and are held thereagainst by retainers 39 having apertures receiving the hollow pins 36 which are then spun over the outer surface of the retainers.

Referring to FIGS. 6 through 10, each shock mounting element or shock insulator 40, of which a pair are used in the lamp, is generally rectangular in plan and in elevation, and is formed of a relatively soft rubber or of a relatively soft rubber-like material. Each element includes a pair of spaced parallel upper and lower walls 41, 41, having centrally located facing recesses 42, 42 and joined by end walls 43, 43. There is also a rear wall 44, thus forming a structure which is closed at each side and at its ends, and has an open front forming a slot 45. Shock mount 40 is further formed with a pair of supporting shoulders extending around the junctures of the walls 41 with the walls 43 and 44. These shoulders, which are indicated at 46, extend diagonally outwardly at an angle of approximately 45 degrees, and have circular outer surfaces. The shoulders 46, extending around three sides of the shock mount, provide central offset or recess portions 47 on the outer surfaces of the walls 41, and recesses 48 on the outer surfaces of the walls 43 and 44.

The slots 45 are arranged to receive wing formations on the lamp bulb socket assembly generally indicated at 50. Referring more particularly to FIGS. 1, 2, 9, and 10, the socket assembly 50 comprises a pair of essentially mating strips 51 and 52 of suitable electrically conductive metal, preferably hardened brass or bronze. Each strip includes a semi-cylindrical central section 53, angular offsets 54 at each end of the cylindrical section, and diametrically extending wing sections 56. Section 56 of strip 51 is formed with tongues 57 engageable through notches 58 in the section 56 of strip 52, so that the two strips may be anchored to each other with wing sections 56 in juxtaposition and parts 53, 53 forming a cylinder to receive the base of a lamp 60. Also, the angular formations 54, 54 cooperate to form slots receiving the pins of the lamp base. Each section 51 and 52 is formed with a bayonet slot 55 extending from the slot provided by the facing formations 54, 54, and it will be noted that the bayonet slot 55 in the strip 51 is offset longitudinally or axially from the bayonet slot 55 in the strip 52. This offsetting arrangement provides for proper orientation of the lamp bulb in its socket.

In assembling the lamp, the wing formations 56, 56 are each inserted into the slot 45 of a shock isolator 40, with the bent over tabs 57, 57 being received by the recesses 42, 42 in the walls 41, 41. The assembly is then positioned with the shoulders 46 of the two shock mountings engaging the seating surfaces 38 of the formations 31, and retainer plate 39 is then positioned to engage the other shoulders 46 and secured by spinning over the hollow pins 36. A short conductor 61 has one end soldered or brazed to a retainer plate 39 and its other end soldered or brazed to a portion of the socket assembly 50, as best seen in FIG. 1. This provides a grounding connection for the lamp socket, and the lamp bulb 60 is of the type having two base contacts arranged to engage the usual type of spring pressed contacts extending through an insulating bushing 62 within the housing with each contact connected to a separate conductor 63 or 64.

It will be noted that, except for the shoulders 46, the shock mounts 40 are completely out of contact with the formations 31 and the retainer plates 39. The portions of the shock mount which are thus out of contact engage the wing formations 56, 56. Thereby, the lamp bulb socket 50 and the lamp bulb 60 are effectively isolated from transmission thereto of any road shocks encountered by the vehicle, the lamp bulb socket and the lamp bulb essentially "riding" in the shock insulators 40 in a sort of a "floating mounting."

Figure 11:
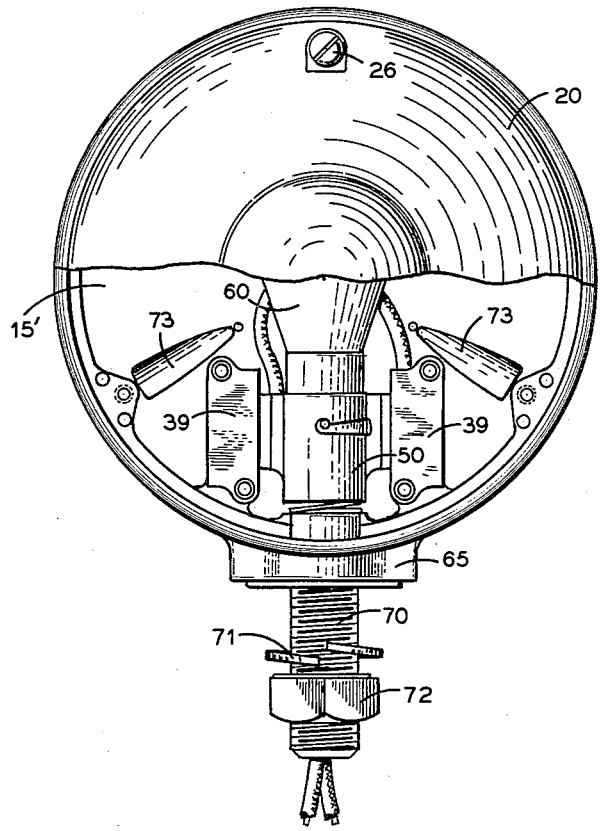
FIG. 11 is a view similar to FIG. 1 illustrating another form of lamp embodying the invention.
Figure 12:
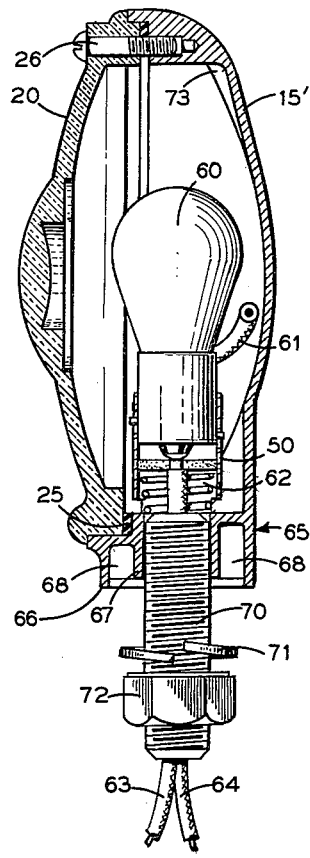
FIG. 12 is a vertical sectional view of the lamp shown in FIG. 11.
Figure 13:
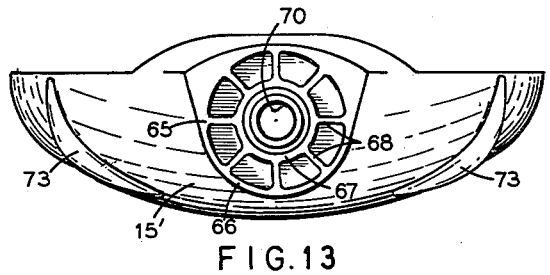
FIG. 13 is a bottom plan view of the housing of the lamp shown in FIG. 11.

The embodiment of the lamp illustrated in FIGS. 11, 12, and 13 is essentially similar to that of FIGS. 1 through 10, the only difference being in the manner in which the lamp is mounted. Identical parts have been given identical reference numbers, and corresponding parts have been given the same reference numeral primed.

As the lamp of FIGS. 11, 12, and 13 is arranged for mounting to project from a surface of the vehicle, as by means of a hollow mounting stud, the peripheral mounting flange 16 of FIGS. 1, 2, 3, 4, and 5 has been omitted. Instead, the housing is provided with an enlarged tubular boss 65 on its lower end formed of a pair of concentric and radially spaced circular walls 66 and 67 interconnected by radial reinforcing ribs 68. A hollow threaded stud 70 extends from the inner wall 67 and carries a lock washer 71 and a nut 72 by means of which the lamp may be secured to a mounting surface. The external conductors 63 and 64 extend outwardly through this hollow stud in the usual manner. While not illustrated in detail in FIGS. 11, 12, and 13, the socket assembly 50 is supported in the housing by the shock mounts 40 in exactly the same manner as in the arrangements shown in FIGS. 1 through 10. Furthermore, the housing 15' may be formed with short radial reinforcements 73.

In the foregoing description, the lamp bulb sockets 50 have been described as arranged to receive lamp bulbs having two base contacts, the bayonet slots 55 being axially offset for proper orientation of the two contacts. However, it should be understood that, while a double contact lamp bulb arrangement has been shown and described for illustrative purposes, the invention is equally applicable to single contact lamps. In such case, the bayonet slots 55 would be centered on the same diametric plane through the socket 50, and only a single conductor 63 or 64 would be brought into the lamp socket and through the insulating bushing 62.

While specific embodiments of the invention have been shown and described in detail to illustrate the application of the principles of the invention, it will be understood that the invention may be embodied otherwise without departing from such principles.

What is claimed is:

1. An automotive vehicle lamp comprising, in combination an open sided metal housing constructed and arranged for mounting upon a surface portion of a vehicle subjected to road shock; a lens operatively connected to said housing to close the open side thereof; a pair of reversely oriented, but otherwise substantially identical, laterally spaced metal wall formations extending substantially rigidly from the inner surface of said housing in facing relation, said wall formations having substantially coplanar relatively narrow ledges on their facing surfaces; a substantially cylindrical lamp bulb socket having a pairs of diametrically opposed fins extending in an axial plane; a pair of sleeves of relatively soft flexible material each having a conforming telescoping fit over one of said fins, said sleeves having relatively narrow peripherally extending enlargements projecting from the general planes of their outer surfaces outwardly of the periphery of said fins, and conforming in planar contour to that of said ledges; said enlargements seating on said ledges within said wall formations and spacing such sleeve outer surfaces therefrom; and means retaining said enlargements in engagement with said ledges; said sleeves isolating said lamp bulb socket from shock transmitted to said housing.

2. An automotive vehicle lamp comprising, in combination, an open sided metal housing constructed and arranged for mounting upon a portion of a vehicle subjected to road shock; a lens operatively connected to said housing to close the open side thereof; a pair of reversely oriented, but otherwise substantially identical, laterally spaced wall formations, channel shaped in plane, extending from the inner surface of said housing in facing relation, said wall formations having substantially coplanar relatively narrow ledges on their inner surfaces, a substantially cylindrical lamp bulb socket having a pair of diametrically opposed substantially rectangular flanges extending in an axial plane; a pair of sleeves of relatively soft flexible material each having a conforming telescoping fit over one of said flanges, each sleeve having a pair of walls overlying the surfaces of the associated flange, and side edges and an outer end edge engaging the edges of the associated flange, whereby to form a relatively shallow rectangular slot receiving the associated flange; said sleeves having relatively narrow peripherally extending enlargements projecting outwardly from both the walls and the edges thereof, and positioned outwardly of the peripheries of said flanges; said enlargements seating on said ledges within said wall formations and spacing the walls of the sleeves therefrom; and means retaining said enlargements seated on said ledges; said sleeves isolating said lamp bulb socket from shocks transmitted to said housing.

3. An automotive vehicle lamp as claimed in claim 2 in which the walls and edges of said sleeves are mutually perpendicular; each of said enlargements extending at an angle of substantially 45 degrees to the associated wall and edge.

4. An automotive vehicle lamp as claimed in claim 3 in which said retaining means comprise plates secured to the outer surfaces of said wall formations and overlying said sleeves, and engaging the enlargements extending from one wall of the associated sleeve.

5. An automotive vehicle lamp as claimed in claim 1 in which said housing is substantially cylindrical in form; said housing having a peripheral radially extending flange apertured to receive fastening means for securing said lamp in substantially flush relation to said surface portion of the motor vehicle with the body of said housing extending through a circular aperture in said surface portion.

6. An automotive vehicle lamp as claimed in claim 1 in which said housing is substantially cylindrical; said housing being formed with a tubular radially extending boss substantially aligned axially with said lamp socket; and a hollow threaded bolt seated in said tubular boss for mounting for said lamp upon said surface portion of the vehicle to project therefrom.

7. An automotive vehicle lamp as claimed in claim 6 in which said tubular boss comprises a pair of concentric radially spaced circular walls integrally interconnected by radially extending ribs.

8. An automotive vehicle lamp as claimed in claim 1 in which said lamp bulb socket comprises a pair of mating metal strips having intermediate substantially circular arched portions facing each other to receive the cylindrical base of the lamp bulb, portions at each end of each arch portion extending parallel to a diameter of the socket and in spaced relation to each other to define an axially extending slot for receiving the pins on a bayonet type lamp bulb base; said mating strips, outwardly of said spaced portions, including spaced superposed radially extending terminal portions constituting said fins, and the terminal portions of one mating strip having slots opening through the outer end of the associated strip; the terminal portions of the other mating strip having tongues engaged in said slots and bent over the terminal portions of said one mating strip to unite said two mating strips to form a lamp socket.

9. An automotive vehicle lamp as claimed in claim 8 including a pair of bayonet slots each in one of said mating sections and each extending from one of said axially extending slots circumferentially of the arched portion of the associated section.

10. An automotive vehicle lamp comprising in combination, an open sided housing constructed and arranged for mounting upon a portion of a vehicle subjected to road shock; a lens connected to said housing to close the open side thereof; a pair of reversely oriented, but otherwise substantially identical, laterally spaced wall formations extending substantially rigidly from the inner surface of said housing in facing relation, said wall formations having substantially co-planar relatively narrow ledges on their facing surfaces; a lamp bulb socket having a pair of diametrically opposed axially extending fins; a pair of sleeves of relatively soft resilient material each having a conforming telescoping fit over one of said fins, said sleeves having peripheral surface portions, outwardly of said fins, seating on said ledges within said wall formations; and means retaining the peripheral portions of said sleeves in engagement with said ledges; said sleeves isolating said lamp bulb socket from shock transmitted to said housing.

11. An automotive vehicle lamp comprising, in combination, an open sided housing constructed and arranged for mounting upon a portion of a vehicle subjected to road shock; a lens connected to said housing to close the open side thereof; a lamp bulb socket assembly including a pair of substantially flat fins extending in opposed directions in an axial plane therefrom; a pair of block shaped sleeves of relatively soft and resilient material having facing surfaces and each having a substantially flat slot extending inwardly from such facing surface thereof; said fins each fitting into the slot in one of said sleeves; said sleeves having portions outwardly of the fins engaged therein seating on the surface portions of said housing; and means retaining said sleeves engaged with said surface portions of said housing; said sleeves isolating said lamp bulb socket assembly from shocks transmitted to said housing.

References Cited in the file of this patent

UNITED STATES PATENTS

| | | |
|---|---|---|
| 1,604,836 | Moldenhauer | Oct. 26, 1926 |
| 1,828,233 | Smith | Oct. 20, 1931 |
| 2,686,868 | Diedring | Aug. 17, 1954 |
| 2,806,937 | Hollins | Sept. 17, 1957 |
| 2,916,607 | Bargman | Dec. 8, 1959 |